United States Patent Office 3,752,793
Patented Aug. 14, 1973

3,752,793
POWDERED COATING MATERIALS
Dieter Arlt, Cologne, Hans-Herwig Bertram, Leichlingen, Josef Pedain, Cologne, and Erich Zankl, deceased, by Helga Zankl and Walter Zankl, Cologne, Germany, and Angelika Zankl de Ramis, Palma de Mallorca, Spain, assignors to Bayer Aktiengesellschaft, Leverkusen, Germany
No Drawing. Filed Oct. 22, 1971, Ser. No. 191,843
Claims priority, application Germany, Sept. 7, 1971,
P 21 44 643.5
Int. Cl. C08f 27/08, 45/72
U.S. Cl. 260—78.5 T                                 5 Claims

ABSTRACT OF THE DISCLOSURE

Powdered coating agent for use in the electrostatic sprayed powder process consisting of mixtures of (A) copolymers
(B) bis- or tris-oxazolines and optionally
(C) auxiliary agents such as pigments and flowing agents.

The copolymer contains polymerised units of

25–60% styrene or derivatives thereof or (meth)acrylonitrile;
30–65% by weight of acrylic or methacrylic esters and
5–20% by weight of $\alpha,\beta$-unsaturated carboxylic acids.

5 to 25 parts by weight of bis- or trisoxazolines are employed for 95 to 75 parts by weight of copolymer.

---

This invention is concerned with powdered coating materials which are composed of mixtures of polyoxazolines and polymers containing carboxyl groups, and which are suitable for use in the electrostatic sprayed powder process.

It is known that heating mono-oxazolines with anhydrides of aliphatic monocarboxylic acids at reflux temperatures followed by treatment with water causes the oxazoline ring to open so as to yield the corresponding O-acylated carboxylic acid amides (cf. United States patent specification No. 2,410,318).

It is also known that 2-phenyloxazoline, for example, reacts with p-nitrobenzoic acid on heating to form the corresponding $\beta$ - benzamidoethyl-p-nitrobenzoate (cf. Journal of Organic Chemistry, volume 15, 1950, pages 802–806).

In addition, the reactions of mono- and bis-(oxazolines) with cyclic dicarboxylic acid anhydrides such as maleic anhydride or copolymers of maleic anhydride with copolymerisable vinyl monomers, to form resinous, cyclic, optionally cross-linked, imido esters have already been proposed (cf. United States patent specifications Nos. 2,543,601; 2,543,602; 2,547,542; and 2,547,495 to 2,547,498).

It is also known that in oxazolines having hydroxyl-containing hydrocarbon radicals as substituents at least at the 4- and 5-positions i.e. on the carbon atoms adjacent to the nitrogen or oxygen, the hydroxyl groups can be reacted, on heating, with polycarboxylic acids having a molecular weight of less than 350. The carbon atom in the 2-position is preferably substituted by the radical of a drying or semi-drying carboxylic acid (cf. United States patent specification No. 3,438,943).

Finally, it is known from the paper by Tsutomu Kagiya et al. in "Journal of Polymer Science" vol. 4, pages 257–260 (1966), that linear polyesteramides can be obtained by the polyaddition of adipic acid to bis(oxazolines) in dimethyl formamide with opening of the oxazoline ring. However, yields of only 24 to 61% of uncross-linked polyesteramides are obtained, even with reaction times of 10 hours and at reaction temperatures of 120° C.

The purpose of the present invention is to produce powdered coating materials from cross-linkable mixtures of polyoxazolines and polymers containing carboxyl groups, for use in the sprayed powder process.

Binding agents for the electrostatic sprayed powder process should, in the uncrosslinked state, be brittle, easily-pulverised resins that remain pourable, non-clumping powders at temperatures up to 60° C. After electrostatic deposition on the substrate, the powders should run smoothly at temperatures of 80 to 120° C. and should bake to give insoluble and infusible coatings at temperatures of 130° C. and above. In addition, the powders must be electrostatically chargeable and hold the electric charge on metal objects until the ring process. Moreover, such binding agents must not prematurely crosslink at temperatures within their flowing range because pigments, catalysts and flowing agents are usually added to the melt at temperatures of about 100° C. If an external cross-linking agent is employed, as in the process of the present invention, then the component acting as cross-linking agent must melt in the same temperature range as the resin, with which they must also be compatible and homogeneously miscible. In addition, after solidification of the mixture, the added crosslinking agent must not adversely affect the stability on storage at temperatures up to 50° C. nor should the system separate out again on cooling. After the flowing and firing process the compatible mixture of cross-linking agent and resin should give a highly reflective coating that is resistant to chemicals, solvents and weathering.

Powdered coatings based on polyepoxides are known and largely meet the above requirements. However, their resistance to weathering is inadequate for many applications and this has induced the industry to develop powdered coatings based on acrylates. Such powdered acrylate resins are, for example, described in French patent specification No. 2,035,185. These resins have methylmethylolether groups firmly attached to the molecule and this permits thermal crosslinking. Such resins, however, possess inadequate storage stability at elevated temperatures such as those encountered in transport in southern countries. The resins usually start to form lumps at temperatures as low as 40° C. and are then no longer capable of being poured. Lasting pourability is, however, an absolute requirement in the case of a powder coating process.

The crosslinkable powdered coating mixtures of the invention meet the above-mentioned requirements of the electrostatic sprayed powder process to an outstanding degree.

Thus the subject of the invention is powdered coating agents for use in the electrostatic sprayed powder process, consisting of mixtures of copolymers comprising, (A) polymerised units of Percent by wt.
(I) Styrene, $\alpha$-methylstyrene, o-chlorostyrene, p-chlorostyrene, p-tert.-butylstyrene, (meth) acrylonitrile or mixtures thereof _____ 25–60
(II) Acrylic acid esters having 1–12 C-atoms in the alcohol residue or methacrylic acid esters having 2–12 C-atoms in the alcohol residue or mixtures thereof _____ 30–65
(III) Methylmethacrylate _____ 0–25
(IV) Acrylic acid, methacrylic acid, itaconic acid, maleic or fumaric acid, crotonic acid or mixtures thereof _____ 5–20 where the sum of the percentage contents of the (I) to (IV) is 100 and the average molecular weight is about 3000 to 20,000, (B) bis- or tris-oxazolines and optionally, (C) auxiliary agents such as pigments and flowing agents, where there are 95 to 75 parts by wt. acrylic resin (A) to 5 to 25 parts by wt. bis- or tris-oxazoline (B) and, optionally, not more than 150% by wt. (calculated on (A)+(B)) of pigments and 0.1 to 5% by wt., calculated on (A), of a flowing agent.

The powders of the invention can be poured at temperatures up to at least 50° C., have a grain size of about 30 to 120μ and possess the advantage that they do not give off volatile components on firing.

Polyoxazolines of the general Formula I are of particular interest for use in the mixture of the invention.

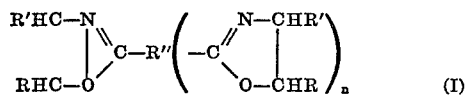

(I)

where R and R' each represents hydrogen, an alkyl radical with 1–8 carbon atoms, or an aryl radical with 6–12 carbon atoms, preferably hydrogen or an alkyl radical with 1 or 2 carbon atoms and most preferably hydrogen; R" represents a polyvalent, in particular a divalent organic radical, preferably an alkylene chain with 1–8 C-atoms or a divalent or trivalent aromatic radical with 6–12 C-atoms, in particular a benzene ring, and $n$ represents the integer 1 or 2.

The following are examples of such oxazolines:

1,2-, 1,3- and 1,4-bis($\Delta^2$-oxazolinyl-2-)benzene;
1,2-, 1,3- and 1,4-bis-($\Delta^2$-4-methyl-oxazolinyl)-2-benzene;
1,2-, 1,3- and 1,4-bis-($\Delta^2$-4-ethyl-oxazonyl-2)-benzene;
1,2,- 1,3- and 1,4-bis-($\Delta^2$-5-methyl-oxazolinyl)-2-benzene;
1,2-, 1,3- and 1,4-bis-($\Delta^2$-5-ethyl-oxazolinyl-2-)-benzene;
1,2,4-tris-($\Delta^2$-oxazolinyl-2)-benzene;
1,2-bis-($\Delta^2$-oxazolinyl-2-)-ethane;
1-,4-bis-($\Delta^2$-oxazolinyl-2)-butane; and
1,4-bis-($\Delta^2$-5-methyl-oxazolinyl-2)-butane.

The copolymers with carboxyl groups are built up from copolymerised units of the following monomers: acrylic acid, methacrylic acid, crotonic acid, maleic acid, fumaric acid, itaconic acid, (meth)acrylic acid esters with 1–12 C-atoms in the alcohol component, styrene, methylstyrene, α-methylstyrene, p-tert.-butylstyrene, halogen-substituted styrenes such as o-chlorostyrene or p-chlorostyrene, acrylonitrile or methacrylonitrile.

The copolymers are preferably constructed of polymerised units derived from acrylic and/or methacrylic acid, (meth)acrylic acid esters with 1–8 C-atoms in the alcohol component, styrene and/or α-methylstyrene.

The concept of a copolymer, in the present invention, includes not only copolymers of the stated composition but also mixtures of copolymers, provided the mixtures are so made up that the total composition is within the above limits.

The copolymers are prepared by the known methods of bulk, solvent, dispersion or pearl polymerization but preferably by solvent or bulk polymerisation. Such processes are, for example, described in "Methoden der Organischen Chemie," Houben-Weyl, 4th edition, volume 14/1, pages 24–556 (1961).

If the polymerisation is carried out in solution, solvents such as methylene chloride, ethanol, iso-propanol, n-propanol, n-butanol, iso-butanol, tert.-butanol, methyl to butyl esters acetic acid acetone, methylethylketone, benzene, toluene etc. may be employed.

The polymerisations are carried out at temperatures of 40 to about 180° C.

Examples of initiators that can be used in amounts of 0.5 to 3% by wt. of monomer are percarbonates, peresters such as tert.-butyl perpivalate or -peroctate, benzoylperoxide, o-methoxybenzoylperoxide, dichlorobenzoylperoxide, azodiisolactic acid dinitrile.

In addition, the usual controllers of molecular weight such as thioglycol, thioglycerine or tert.-dodecylmercaptan may be employed.

The copolymer solution is treated, in suitable apparatus, preferably evaporator spirals, at temperatures of about 90 to 180° C., to remove the solvent, for example by the process of the pending U.S. application No. 110,696, then cooled, granulated and ground. However, the separation can also be carried out in other ways, such as by spray-drying, removal of the solvent with steam and simultaneous dispersion in water, or by precipitation with water from a solvent miscible with water.

After isolation, the copolymers can be mixed, at temperatures of 80 to about 120° C., with up to 150% by wt., preferably not more than 100% by wt., of inorganic or organic pigments, calculated on the weight of copolymer. Examples of suitable pigments are titanium dioxide, iron oxides, chromium oxide, lead chromates, cadmium sulphide, carbon black, aluminum- and copperbronze, phthalocyanine- and azo-pigments.

In addition, flowing agents (0.1–5% by wt., calculated on the copolymer) such as silicones, poly-2-ethylhexylacrylate, polybutylacrylate or their copolymers, and cellulose derivatives, as well as catalysts such as organic or inorganic acids, tertiary amines, dicyandiamide or tin compounds, can be added to the melts. Fillers such as barium sulphate, aluminium oxide or tin oxide, may also optionally be added.

Of course, it is also possible to add the pigments and flowing agents to the monomers before the polymerisation or after solvent polymerisation and before removal of the solvent.

The polyoxazoline is preferably mixed in by means of a spiral mixer at temperatures of 80–120° C., together with the pigments, flowing agent and catalysts. The mixing times should be about 1 to 10 minutes. Longer mixing gives rise to incipient cross-linking of the product. Under these conditions, homogeneous mixing takes place and separation does not occur even on cooling.

On cooling in their non-cross-linked state the mixtures, which are now free of solvent, optionally pigmented and brittle are ground to a grain size of about 30 to 120μ and possibly sieved according to grain size.

The polymer powders to be used in accordance with the invention are still pourable at temperatures of at least 50° C., preferably 60° C., have flowing temperatures of about 80 to 120° C. and are fired at temperatures from about 130° C. to 220° C., preferably 160 to 200° C., for 3–30 minutes to bring about cross-linking.

The average molecular weights of the powdered polymers are between about 3000 and 20,000, preferably 3000 to 10,000 as measured by the reduction in vapour pressure in an organic solvent such as acetone.

Application of the powder to suitable substrates, in particular metals, is carried out by the known methods of electrostatic powder spraying (40 to 90 kv.). Cf. D. R. Davis, "Coating With Electrostatic Dry-Spray," in Plastics Technology, June 1962, pages 37–38.

The fired coatings (40 to 300μ thick) of the powdered polymers employed in accordance with the invention possess excellent adherence and hardness together with elasticity. In addition, they are notable for their high polish and resistance to weathering.

The powders can be used for coating household equipment, metal parts in the motor industry and metal parts subject to severe weathering, such as motor-car body work, external metal sheets on buildings, pipes and wire mesh as well as equipment used in forestry and agriculture.

PREPARATION OF THE POLYOXAZOLINES EMPLOYED

A solution containing one mol of a polycarboxylic acid chloride ($n$ carbonyl chloride groups where $n$ is the integer 2 or 3) in an inert solvent—eg. chlorobenzene, toluene or xylene—together with 3 n mol caustic alkali solution is added dropwise to an aqueous solution of n mol 2-chloro-(or bromo-)ethylamine hydrochloride while stirring the temperature of the reaction mixture being maintained by cooling at 10–20° C. The mixture is then heated for some hours at 100° C. The organic phase is removed and the solvent distilled off leaving the polyoxazoline.

Further general instructions for the preparation of oxazolines are given in Angewandte Chemie 78, page 914 (1966).

PREPARATION OF THE POWDERED POLYMER FOR EXAMPLES 1 AND 2

In a 40 l. vessel equipped with stirrer, 8 kg. of a monomer mixture consisting of 50 parts by weight styrene, 35 parts by weight butyl acrylate, 15 parts by weight acrylic acid, 1 part by weight tert.-dodecyl mercaptan and 0.005 part by weight hydroquinone was brought up to light reflux under nitrogen. A temperature of 130 to 140° C. was established. A cooled mixture of 15 g. tert.-butyl perpivalate in a petroleum fraction (B.P.$_{760}$ 70–130° C.) and 640 g. of the monomer mixture was added gradually over a period of one hour to the monomer mixture in the vessel and polymerised at the same time. The solids content was now 80% (determined by evaporation of a sample at 250° C. for 30 minutes). If the reaction proceeded too violently, stopping the addition of initiator sufficed to control it, the polymerisation ceasing within a few seconds. A mixture of 16 kg. monomer mixture and 160 g. tert.-butyl perpivalate (the components were mixed shortly before the addition in a vessel cooled with brine) was added to the melt at 140 to 145° C. over a period of 3 hours, then, after the reaction had ceased, the melt was heated to 160° C. and in the course of a further hour 180 g. di-tert.-butylperoxide and 180 g. monomer mixture were added dropwise. The volatile components (catalyst decomposition products, monomer impurities) were then distilled off and the temperature was then maintained at 170° C. for 2 hours. After this the melt was degassed for a short time under vacuum and then run off. The lacquer had a melting point of 95° C. and could be pulverised without forming lumps. The average molecular weight was about 6000, measured osmometrically in acetone. The copolymer consisted of about 50% by wt. styrene, about 15% by wt. acrylic acid and about 35% by wt. butyl/acrylate.

Example 1

A mixture of 100 parts by weight of the polyacrylate described above, 20 parts by weight 1,3-bis($\Delta^2$-oxazolinyl-2)-benzene and 60 parts by weight titanium dioxide (rutile type) was prepared in an extruder.

The temperature in the extruder was 100–110° C. and the time spent in it about 25 seconds. The mixture was ground and sieved.

The powdered mixture possessed an unlimited storage-stability at 50° C. and the pourability was retained.

The powdered mixture was applied to degreased metal sheets by means of a commercial spray-gun. The applied voltage was 60 kv.; the particles becoming negatively charged.

After firing at 180° (30 minutes) a scratch-resistant elastic film was obtained the thickness of which was 65$\mu$ and which gave the following test results:

| | |
|---|---|
| Indentation value (Erichsen value) according to DIN 53 156. | 8.6 mm. |
| Cross (grid) cutting test according to DIN 53 151. | GT. 1 |
| Mandred bending test according to Gardner. | 4 mm. |
| Gloss according to ASTM D 523 ($\not<60°$). | 94%. |
| Brief weathering test in Sunshine-Weatherometer. | Chalking beginning after 500 hours. |

Example 2

In an extruder a mixture was prepared, comprising 100 parts by weight of the above-described polyacrylate, 20 parts by weight 1,4-bis-($\Delta^2$-oxazolinyl-2)-benzene, 60 parts by weight titanium dioxide (rutile type), and 1 part by weight of the flowing agent "Modaflow" produced by the firm of Monsanto. The extruder temperature was 100° C. and the time spent in the extruder 20–30 seconds. The ground mixture, sieved to a grain size of less than 80$\mu$, was still fully pourable after storage for 24 hours at 60° C.

This mixture, as in Example 1, was applied electrostatically to metal sheets and fired at 160° C. or at 180° C. The following results were obtained:

| | 30 min. 160° | 15 min. 180° | 30 min. 180° |
|---|---|---|---|
| Erichsen value, according to DIN 53 156, mm | 9.8 | 10.0 | 0.01 |
| Cross cutting test, according to DIN 53 151 | GT 1 | GT 1 | GT 1 |
| Gardner's mandrel bending test, mm | 2 | 2 | 2 |
| Gloss, according to ASTM D 523 ($\not<60°$), percent | 95 | 95 | 95 |

The thickness of the coating was 70$\mu$.

Example 3

100 parts by weight of a polymer made from 50% by wt. styrene, 10% by wt. acrylic acid and 40% by wt. butyl acrylate and 10 parts by weight 1,3-bis-($\Delta^2$-oxazolinyl-2-)benzene average molecular weight, measured osmometrically in acetone about 4000) was finely ground and mixed with 55 parts by weight titanium dioxide (rutile type). This mixture was homogenised by melting in an extruder where the jacket temperature of the extruder was 70° C., the exit temperature of the melt 90° C. and the time spent in the heating zone 20 seconds. After setting, the melt was granulated and finely ground in an air-blast mill. The particles having a diameter greater than 80$\mu$ were removed by sieving. The powder thus obtained could without difficulty be applied to thoroughly degreased metal sheets by means of a commercial electrostatic spray-gun. The applied voltage was about 60 kv.; the particles becoming negatively charged. After firing for 30 minutes at 180° C., very good reflective coatings with good wearing properties, good elasticity and scratch-resistant surfaces were obtained. The thickness of the coatings was 150$\mu$.

Example 4

The procedure was the same as in Example 3, using the same polymer but 1,2 - bis-($\Delta^2$-oxazolinyl-2)-benzene as cross-linking agent. In this case too, well cross-linked hard coatings were obtained.

Example 5

Example 1 was repeated except that in this case a resin of the following composition was employed:

| | Percent by wt. |
|---|---|
| Styrene | 25 |
| Butyl methacrylate | 10 |
| Methyl methacrylate | 15 |
| Acrylic acid | 15 |
| Butyl acrylate | 35 | having a measured molecular weight of about 5000. The polymer was prepared as described in Example 1.

The following test results were obtained with electrostatically coated sheets as in Example 1:

Erichsen value according to DIN 53 156. — 7 mm.
Gloss according to ASTM D 523 (≮60°). — 95°.
Resistance to solvent — No marking by toluene after 2 minute regeneration.
Resistance to weathering — 700 hours in the Sunshine-Weatherometer Test.
Storage stability of the pigmented powder. — 48 hours at 55° C., no formation of lumps.

Example 6

In an extruder a mixture was prepared from 100 parts by weight of a polyacrylate made of 55% styrene, 35% butylacrylate and 10% acrylic acid (average molecular weight, measured osmometrically in acetone 7600),
15 parts by weight 1,4-bis-($\Delta^2$-oxazolinyl-2)-benzene,
60 parts by weight titanium dioxide (rutile type),
1.5 parts by weight of the flowing agent "Modaflow" produced by the firm Monsanto.

The extruder temperature was 100° and the time spent in the extruder about 20 seconds. The ground mixture, sieved to a grain size of less than 80μ, was fully pourable after storing for one month at 50°.

This mixture was applied electrostatically, as in Example 1, to metal sheets and fired at 160° C. and at 180° C. The following results were obtained:

|  | 30 min. 160° | 15 min. 180° |
|---|---|---|
| Erichsen value, according to DIN 53 156, mm | 8.3 | 10.0 |
| Gardner's mandrel bending test, mm | 2 | 2 |
| Gloss, according to ASTM D 523 (≮60°), percent | 85 | 85 |

Example 7

A powdered mixture was prepared and tested as in Example 1, except that instead of 1,4-bis-($\Delta^2$-oxazolinyl-2-)-benzene, the same proportion by weight of 1,2,4-tris-($\Delta^2$-oxazolinyl-2)-benzene was added.

A powdered of unlimited storage stability at 50° C. was obtained which was fired at 180° for not more than 30 minutes and gave an Erichsen-value (DIN 53 156) result of 7.5 mm. (thickness of coating 70μ).

We claim:
1. A powdered coating agent consisting of a mixture of:
(A) a random addition copolymer of:
(I) 25–60% by weight styrene, α-methylstyrene, o-chlorostyrene, p-chlorostyrene, p-tert-butylstyrene, acrylonitrile, methacrylonitrile or mixtures thereof;
(II) 30–65% by weight acrylic acid esters having 1–12 carbon atoms in the alcohol residue of methacrylic acid esters having 2–12 carbon atoms in the alcohol residue or mixtures thereof;
(III) 0–25% by weight methyl methacrylate and
(IV) 5–20% by weight acrylic acid, methacrylic acid, itaconic acid, maleic acid, fumaric acid, crotonic acid or mixtures thereof;
wherein the sum of the percentage contents of (I) to (IV) is 100 and the average molecular weight of said copolymer is 3000 to 20,000,
(B) an oxazoline of the formula

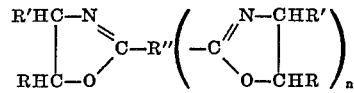

wherein R and R' are each hydrogen or alkyl having 1 to 2 carbon atoms; R" is a divalent or trivalent saturated aliphatic hydrocarbon radical having 1 to 8 carbon atoms or a divalent or trivalent benzene ring and n is 1 or 2 and optionally
(C) auxiliary agents such as pigments and flowing agents, wherein there are 95 to 75 parts by weight of said copolymer (A) to 5 to 25 parts by weight of said oxazoline (B) as well as optionally not more than 150% by weight, based on (A) and (B) together, of pigments and 0.1 to 5% by weight, based on (A), of a flowing agent.
2. Coating agent according to claim 1, in which the oxazoline is 1,4-bis-($\Delta^2$oxazolinyl-2)-benzene.
3. Coating agent according to claim 1, in which the oxazoline is 1,3-bis-($\Delta^2$-oxazolinyl-2)-benzene.
4. Coating agent according to claim 1, in which the oxazoline is 1,2-bis-($\Delta^2$-oxazolinyl-2)-benzene.
5. Coating agent according to claim 1, in which the oxazoline is 1,2,4-tris-($\Delta^2$-oxazolinyl-2)-benzene.

References Cited
UNITED STATES PATENTS
2,543,602   2/1951   Rowland _____ 260—78.5
3,208,981   9/1965   Miranda _____ 260—78.5

OTHER REFERENCES
Journal of Polymer Science, vol. 4, pp. 257–260 (1966), Kagiya et al.

JOSEPH L. SCHOFER, Primary Examiner
J. KIGHT III, Assistant Examiner

U.S. Cl. X.R.
117—127, 161 UT, UN; 260—41 R, A, B, C, 80.8, 80.81

UNITED STATES PATENT OFFICE
CERTIFICATE OF CORRECTION

Patent No. 3,752,793          Dated August 14, 1973

Inventor(s) Dieter Arlt et al

It is certified that error appears in the above-identified patent and that said Letters Patent are hereby corrected as shown below:

Col. 6, line 30, "0.01" should read "10.0".

Col. 8, line 5, "of" should read "or".

Signed and sealed this 5th day of March 1974.

(SEAL)
Attest:

EDWARD M. FLETCHER, JR.
Attesting Officer

C. MARSHALL DANN
Commissioner of Patents